US007946616B2

(12) United States Patent
Ochiai et al.

(10) Patent No.: US 7,946,616 B2
(45) Date of Patent: May 24, 2011

(54) SIDE AIRBAG APPARATUS

(75) Inventors: Fumiharu Ochiai, Wako (JP);
Fumitoshi Yasuhara, Wako (JP);
Tadashi Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/783,211

(22) Filed: May 19, 2010

(65) Prior Publication Data

US 2010/0295277 A1 Nov. 25, 2010

(30) Foreign Application Priority Data

May 20, 2009 (JP) ................................. 2009-121763

(51) Int. Cl.
*B60R 21/16* (2006.01)
(52) U.S. Cl. .................................................... 280/730.2
(58) Field of Classification Search ............... 280/730.2, 280/729; B60R 21/16, 21/20
See application file for complete search history.

(56) References Cited

U.S. PATENT DOCUMENTS

| 7,862,077 | B2 * | 1/2011 | Yokota ........................ 280/730.2 |
| 2006/0001244 | A1 * | 1/2006 | Taguchi et al. ............... 280/729 |
| 2006/0022441 | A1 * | 2/2006 | Hayashi et al. ............. 280/730.2 |
| 2007/0290488 | A1 * | 12/2007 | Taguchi et al. ............. 280/730.2 |

FOREIGN PATENT DOCUMENTS

JP 2003-137059 5/2003

* cited by examiner

*Primary Examiner* — Faye M. Fleming
(74) *Attorney, Agent, or Firm* — Rankin, Hill & Clark LLP (57) ABSTRACT

A side airbag apparatus deployed between a vehicle compartment sidewall and a vehicle occupant. The airbag has an upper chamber, a lower chamber, and a middle chamber formed between the upper and lower chambers. The middle chamber is deployed prior to the timing of deployment of the upper and lower chambers.

14 Claims, 8 Drawing Sheets

SIDE AIRBAG APPARATUS

FIELD OF THE INVENTION

The present invention relates to a side airbag apparatus deployed between a vehicle compartment sidewall and a vehicle occupant.

BACKGROUND OF THE INVENTION

There are known side airbag apparatuses for deploying between a seat occupied by a vehicle occupant and a door for entering and exiting the vehicle by the occupant. Such side airbag apparatuses cushion a side-collision (side-impact collision) load and protect the vehicle occupant when a side-collision occurs to the vehicle.

A side airbag provided to a seatback for supporting the back of the vehicle occupant in the seat is known as such a side airbag apparatus, as disclosed in Japanese Patent Application Laid-Open Publication No. 2003-137059 (JP 2003-137059 A), for example.

In the side airbag apparatus disclosed in JP 2003-137059 A, the outer circumferences of two flat pieces of foundation cloth are sewn together to form an airbag. The airbag is constructed of a non-expanding section that is not inflated with a fluid gas, and a plurality of inflating chambers that is inflated with the fluid gas. An elastic structure is used for the non-expanding section to allow the non-expanding section to stretch when the airbag is deployed. Specifically, an elastic structure is used for the non-expanding section to stabilize the airbag when the airbag is deployed and inflated. The elastic structure of the non-expanding section of the airbag is formed with slits.

However, in the side airbag apparatus disclosed in JP 2003-137059 A, because the elastic structure of the non-expanding section of the airbag is formed with slits, the slits interfere with the armrests and other components present in the vehicle compartment, and the airbag sometimes cannot be immediately deployed.

Moreover, because the non-expanding section not inflated by fluid gas is an elastic structure in the side airbag apparatus, the shape of the upper and lower channels is hard to stabilize, and deviation of the protected area from the intended range is possible.

SUMMARY OF THE INVENTION

It is therefore an object of the present invention to provide a side airbag apparatus in which an airbag deployed between a vehicle compartment sidewall and a vehicle occupant can be immediately deployed and the force for restraining the vehicle occupant can be enhanced.

According to the present invention, there is provided a side airbag apparatus having an airbag deployed from a folded state between a sidewall of a vehicle compartment and an occupant by a gas supplied from an inflator, characterized in that the airbag comprises: an upper chamber designed to be deployed forward from a side upper section of a seat; a lower chamber designed to be deployed forward from a side lower section of the seat; and a middle chamber disposed closely to the inflator, between the upper chamber and the lower chamber, wherein the middle chamber has a forward edge extending in a direction substantially orthogonal to a direction of deployment of the airbag and formed further rearward than a forward edge of the upper chamber and a forward edge of the lower chamber.

In the side airbag apparatus, the airbag is stored in a folded state and is deployed between the vehicle compartment sidewall and the vehicle occupant by the supply of gas from the inflator. The airbag has the upper chamber deployed to the upper section of the seat at the chest and shoulders of the vehicle occupant, and the lower chamber deployed to the lower section of the seat at the lower back of the vehicle occupant. The middle chamber is deployed sooner than the timing for deploying the upper chamber and lower chamber. The upper and lower chambers are thereby deployed immediately without interference with the armrest.

Moreover, because the distance between the upper chamber and the lower chamber is restricted by the middle chamber, the upper chamber and lower chamber can be deployed immediately and in a stable state.

Furthermore, it is possible to cover the area between the vehicle compartment sidewall and the vehicle occupant with the middle chamber in a smooth manner. The result is that the chest area of the vehicle occupant can be efficiently restrained by the middle chamber with quick timing.

Preferably, the airbag has a first non-expanding section provided between the middle chamber and the inflator. Accordingly, the upper chamber and lower chamber are restricted so as not to be too far from each other, and the deployment shape can be stabilized to a higher degree.

Desirably, the airbag includes a second non-expanding section extending between the upper chamber and the lower chamber, the second non-expanding section being positioned oppositely from the inflator, with the middle chamber interposed therebetween. Thus, the upper chamber and lower chamber further forward than the middle chamber are restricted so as not to be too far from each other, and the airbag can be stabilized after the deployment is complete.

In a preferred form, the middle chamber is disposed in opposed relation to an armrest provided on the vehicle compartment sidewall, the armrest having a hollow section that comes into contact with the middle chamber for maintaining the airbag stable in orientation. The middle chamber can therefore be prevented from being displaced. Because the surface area of contact between the vehicle compartment sidewall and the middle chamber can be increased, the force for restraining the vehicle occupant can be enhanced.

It is desirable that the airbag have a distal folded section for folding up the forward edges of the upper and lower chambers, and an inflator-facing folded section for folding up the inflator area of the upper and lower chambers together with the middle chamber. Accordingly, the distal folded section can be expanded after the inflator-facing folded section is expanded. That is, the expansion timing of the inflator-facing folded section and the distal folded section is staggered, whereby the pressure of the middle chamber can be raised first. The airbag can thereby be stably deployed

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

First Embodiment

Figure 1:
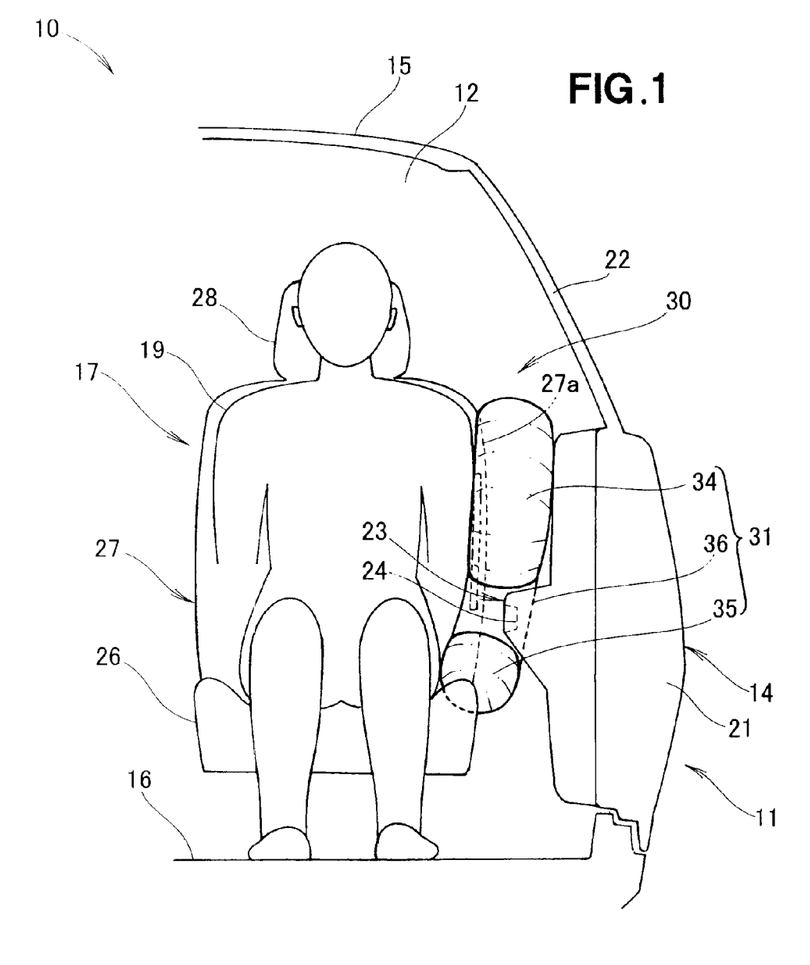
FIG. 1 is a front elevational view showing a side airbag apparatus according to a first embodiment of the present invention.

As shown in FIG. 1, a vehicle 10 has a door 14 that constitutes a side surface of a vehicle body 11 and is used for entry and exit by a vehicle occupant 19, a roof 15 that constitutes an upper section of the vehicle body 11, a vehicle body floor 16 that constitutes a lower section of the vehicle body 11, a vehicle seat 17 (hereafter simply referred to as "seat 17") provided to the vehicle body floor 16 and used for sitting by the vehicle occupant 19, and a side airbag apparatus 30 provided to the seat 17 and deployed between the seat 17 and the door 14.

The door 14 has a door body 21, a window 22 provided to an upper section of the door body 21 so as to be able to move up and down, and an armrest 23 provided so as to protrude into the door body 21 and used as an elbow rest by the vehicle occupant 19. The door 14 is one aspect of the side wall that forms a passenger or vehicle compartment.

Figure 2:
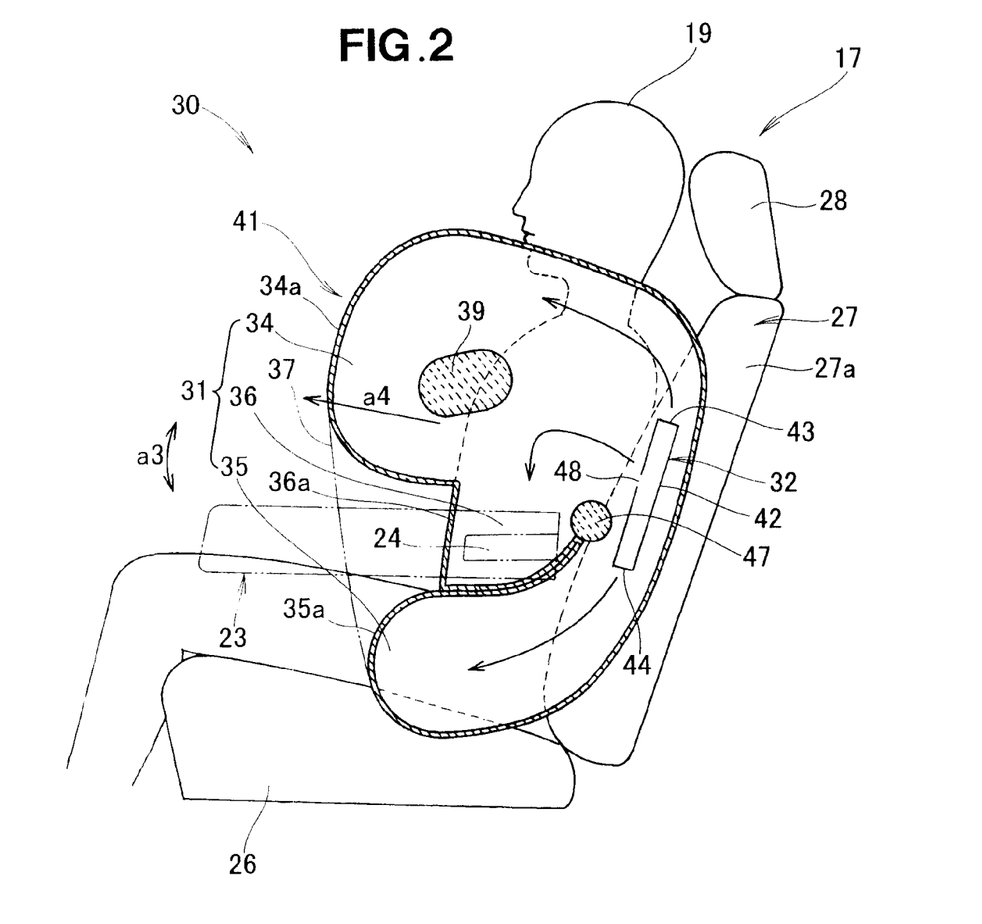
FIG. 2 is a cross-sectional view illustrating the side airbag apparatus of FIG. 1.

The armrest 23 comes into contact with a middle chamber 36 of the side airbag apparatus 30 and has a hollow section (depressed portion) 24 formed in order to maintain the stability of the orientation of the airbag 31. As shown in FIG. 2, the movement of the airbag 31 along arrow a3 can be stopped, and the stable orientation (stabilization) of the airbag 31 can be enhanced.

The seat 17 has a seat cushion 26 for supporting the lower back of the vehicle occupant 19; a seatback 27 attached to the seat cushion 26 so as to be able to recline, and used to support the back of the vehicle occupant 19; and a head rest 28 attached to the upper section of the seatback 27 so as to be able to move up and down, and used to support the head of the vehicle occupant 19.

As shown in FIGS. 1 and 2, the side airbag apparatus 30 has an airbag 31 provided to a door-facing side surface 27a of the seatback 27, and an inflator 32 supported by the door-facing side surface 27a of the seatback 27 and provided to the interior of the airbag 31.

The airbag 31 is stored in a folded state inside a section of the seatback 27 corresponding to the door-facing side surface 27a, and is deployed between the vehicle compartment sidewall (door) 14 and the vehicle occupant 19 by gas supplied from the inflator 32.

The airbag 31 includes an upper chamber 34 designed to deployed toward the side upper part of the seat 17 and the chest and shoulders of the vehicle occupant; a lower chamber 35 designed to be deployed toward the side lower part of the seat 17 and waist of the vehicle occupant; and a middle chamber 36 having a forward edge 36a extending in a direction substantially orthogonal to the direction of deployment of the airbag 31 in a position further rearward than a forward edge 34a of the upper chamber 34 and a forward edge 35a of the lower chamber 35. The forward edge 36a of the middle chamber 36 constitutes a central region in the forward edge 41 of the airbag. The airbag 31 includes a first non-expanding section 47 provided between the middle chamber 36 and the inflator 32, and a non-expanding section 39 provided to the upper chamber 34 and disposed inside the upper chamber.

Because the upper chamber 34 is comparatively large, the thickness must be restricted in order to ensure the necessary deployment area. The non-expanding section 39 disposed in the upper chamber is therefore provided.

The inflator 32 has a tubular inflator case 42 attached to the door-facing side surface 27a of the seatback 27 via the airbag 31, an explosive (not shown) stored inside the inflator case 42, a first gas supply opening 43 provided to one tubular end of the inflator case 42, a second gas supply opening 44 provided to the other tubular end of the inflator case 42, and a third gas supply opening 48 provided to the front section of the inflator case 42.

Figure 3:
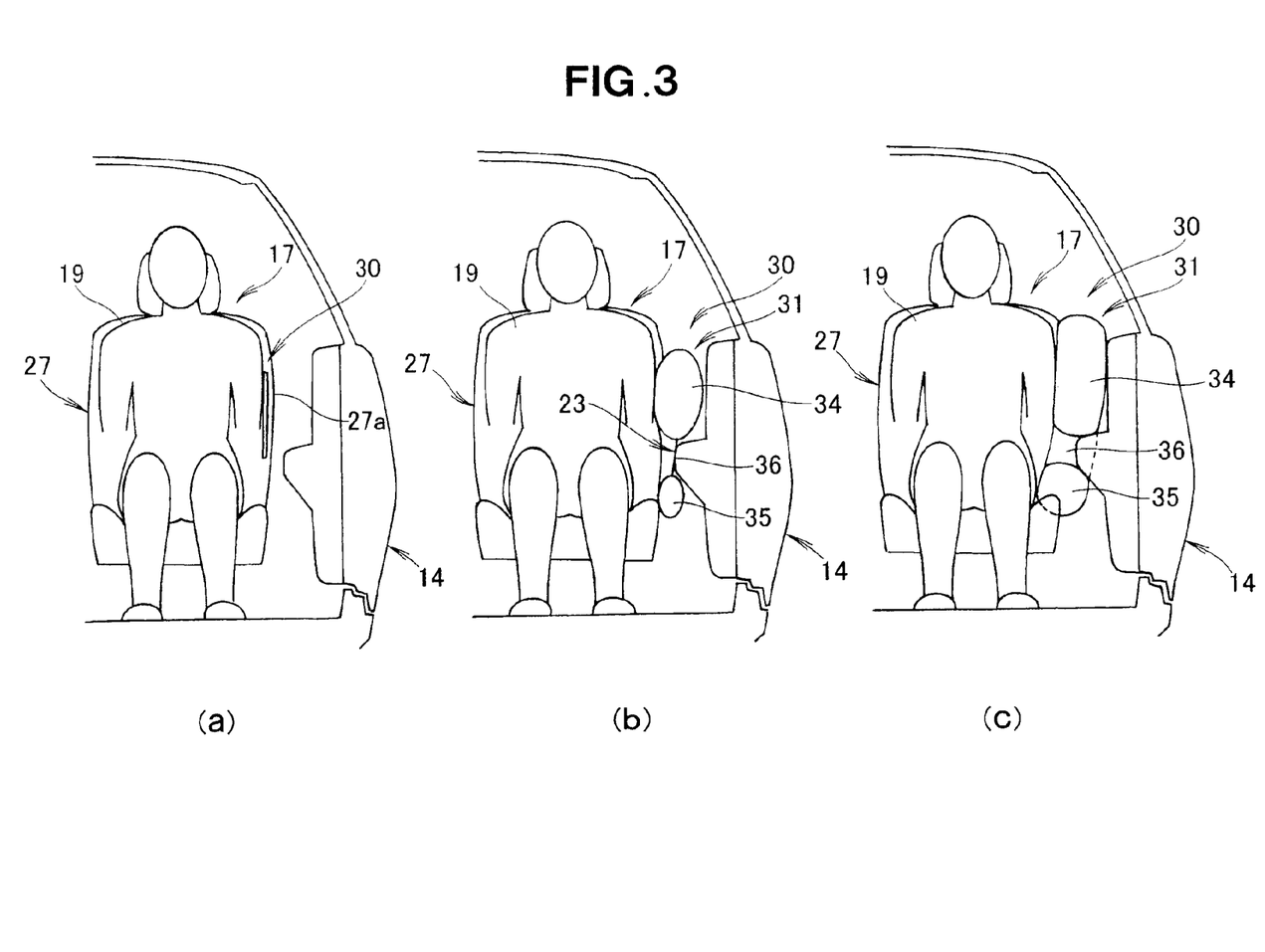
FIGS. 3 and 4 are schematic views showing the airbag as deployed.
Figure 4:
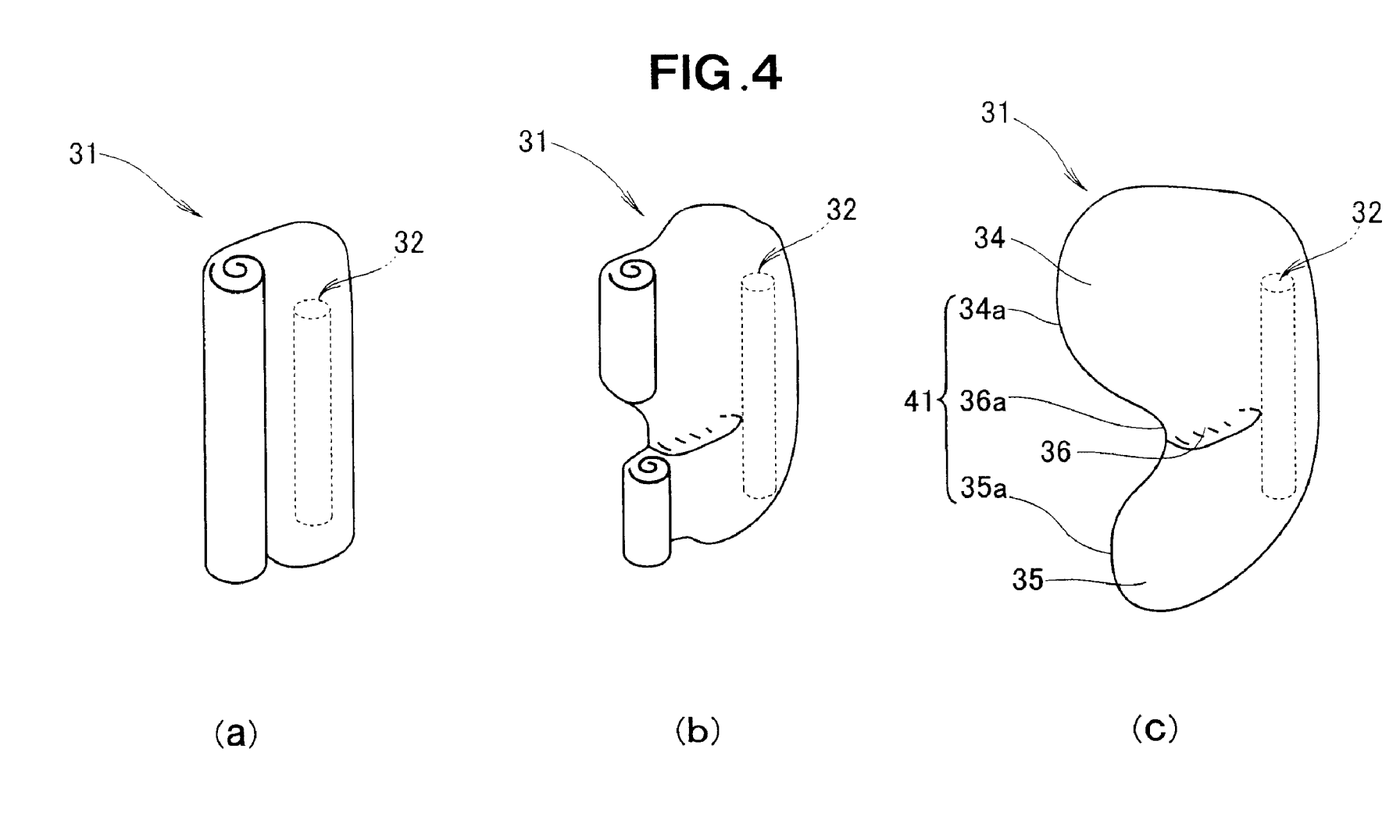

Before ignition of the inflator 32, the airbag 31 shown in FIG. 4(a) is stored inside the door-facing side surface 27a of the seatback 27 shown in FIG. 3(a) in a folded state. At that time, the entire airbag 31 is rolled into a roll from the forward edge 41 of the airbag in the direction of the inflator 32 and folded into an accordion shape, as shown in FIG. 4(b).

FIGS. 5(a) to 5(d) illustrate the method for folding the airbag 31.

Figure 5:
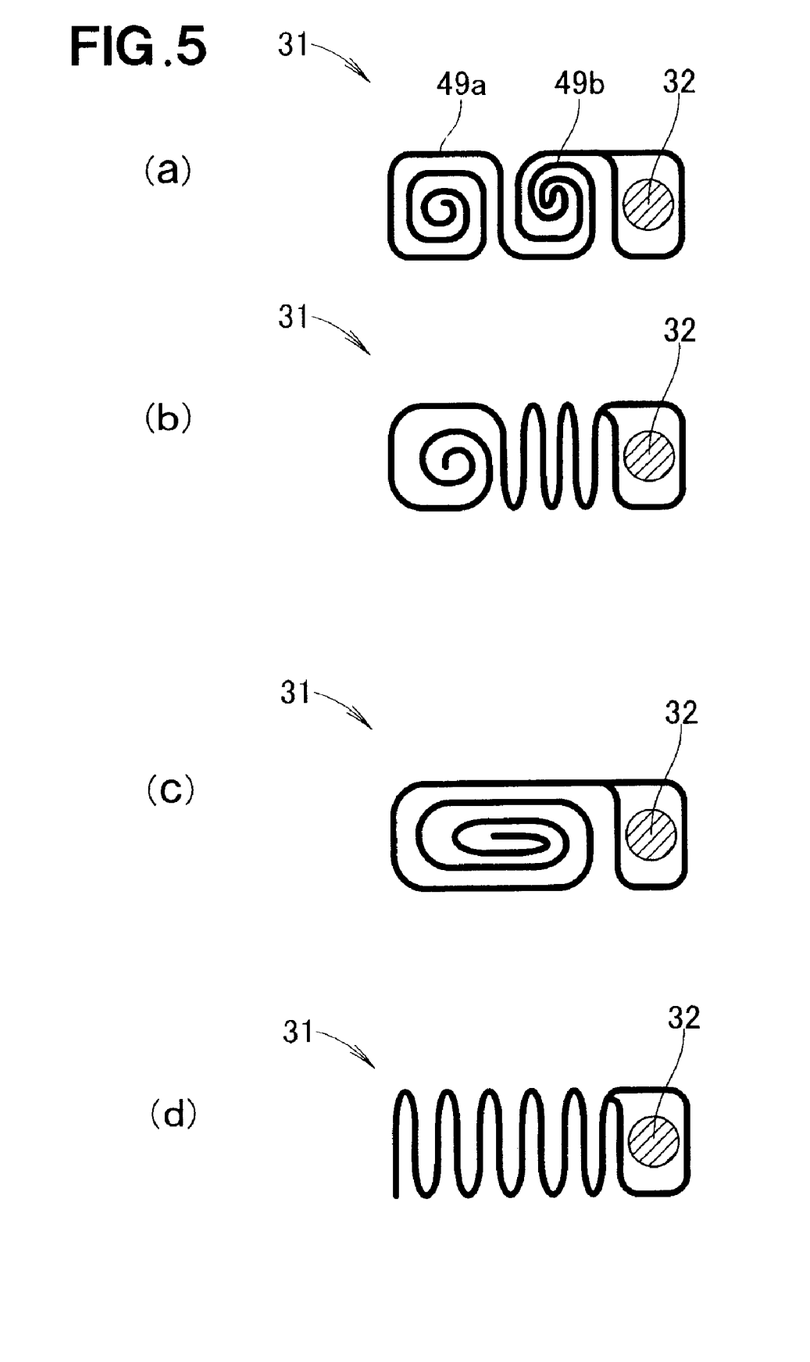
FIG. 5 is a schematic view illustrating a mode of folding of the airbag of FIG. 1.

As an example, a distal end of the airbag 31 (FIG. 2) is rolled into a roll, and the middle chamber 36 is rolled up in the opposite direction of the distal end of the airbag 31, as shown in FIG. 5(a).

More specifically, the airbag 31 is folded according to the following sequence: a distal folded section 49a for folding up the forward edge 34a of the upper chamber 34 and the forward edge 35a of the lower chamber 35 shown in FIG. 2, and an inflator-facing folded section 49b for folding up the area near the inflator 32 of the upper chamber 34 and the lower chamber 35 together with the middle chamber 36. The timing at which the inflator-facing folded section 49b and the distal folded section 49a are deployed is thereby staggered, and the pressure of the middle chamber 36 can thereby be raised first. The airbag 31 can thereby be stably deployed.

The distal end of the airbag 31 is rolled up and the middle chamber 36 is folded into an accordion shape, as shown in FIG. 5(b). This makes it desirable to use a configuration in which a central portion of the airbag 31 including the middle chamber 36 can be folded up, and in which the increase in internal pressure occurs at an earlier stage in the central portion of the airbag 31 than in the upper chamber 34 and the lower chamber 35.

The airbag 31 can be stored easily by being rolled in its entirety or folded into an accordion shape, as shown in FIGS. 5(c) and 5(d).

In the airbag 31, gas is supplied to the middle chamber 36 and the inflator 32 area of the upper chamber 34 and the lower chamber 35 immediately after ignition of the inflator 32, as shown in FIGS. 3(b) and 4(b). Deployment therefore occurs in a state in which the area between the upper chamber 34 and the lower chamber 35 is linked to the area near the middle chamber 36. The deployment is promoted by restricting the middle chamber 36 so that the upper chamber 34 and the lower chamber 35 are not too far from each other, and supporting the upper chamber 34 and the lower chamber 35 toward the inflator 32 area and the vehicle compartment sidewall (door) 14.

After a predetermined time has passed following the ignition of the inflator 32, the forward edge 34a of the upper chamber 34 and the forward edge 35a of the lower chamber 35 are deployed from the forward edge 36a of the middle chamber 36 further in the forward direction, as shown in FIGS. 3(c) and 4(c), and deployment of the airbag 31 is completed.

In the side airbag apparatus 30, the airbag 31 is stored in a folded state and deployed between the vehicle compartment sidewall and the vehicle occupant 19 by the supply of gas from the inflator 32, as shown in FIGS. 1 and 2. The airbag 31 includes the upper chamber 34 designed to be deployed forward from the side upper part of the seat 17 positioned above the armrest 23 which is provided on the vehicle compartment sidewall, and the lower chamber 35 designed to be deployed forward from the side lower section of the seat 17 positioned below the armrest 23.

The airbag 31 further includes a middle chamber 36 formed in the inflator 32 area between the upper chamber 34 and the lower chamber 35. The middle chamber 36 has the forward edge 36a which extends in a direction substantially orthogonal to the direction of deployment (direction of arrow a4) of the airbag 31 and is positioned further rearward than the forward edge 34a of the upper chamber 34 and the forward edge 35a of the lower chamber 35. The forward edge 36a constitutes a central region in the forward edge 41 of the airbag. Therefore, the middle chamber 36 can be deployed before the deployment of the upper chamber 34 and the lower chamber 35 is completed. The shape of the upper chamber 34 and the lower chamber 35 can thereby be stabilized at an early stage. Because the deployment range at the front and back of the middle chamber 36 is limited, the volume is small in comparison with the upper chamber 34 and the lower chamber 35. The entire upper chamber 34 and lower chamber 35 can thereby be deployed immediately without interference with the armrest 23 or the like.

The upper and lower chambers 34, 35 can be deployed after the middle chamber 36 is brought into contact with the armrest 23. The airbag 31 can thereby be supported by the armrest 23 using the middle chamber 36. As a result, the shape and deployment orientation of the airbag 31 can be stabilized.

Furthermore, it is possible to cover the armrest 23 by the middle chamber 36 in a smooth manner because the upper and lower chambers 34, 35 can be deployed after the middle chamber 36 is brought into contact with the armrest 23. The result is that a stomach area of the vehicle occupant 19 can be efficiently restrained by the middle chamber 36.

The airbag 31 has the first non-expanding section 47, and the first non-expanding section 47 is disposed near the inflator 32, which is positioned further rearward than the middle chamber 36. Accordingly, the upper chamber 34 and the lower chamber 35 further forward than the middle chamber 36 are restricted by the first non-expanding section 47 so as not to be too far from each other. The result is that the completely deployed airbag 31 is stabilized.

The airbag 31 may include a second non-expanding section 37 extended between the upper chamber 34 and the lower chamber 35, as shown by the imaginary line. In this construction, the second non-expanding section 37 is disposed in a position opposite the position of the inflator 32, with the middle chamber 36 interposed therebetween. Therefore, the upper chamber 34 and the lower chamber 35 are restricted so as not to be too far from each other, and the deployment shape can be stabilized to a higher degree.

The armrest 23 is brought into contact with the middle chamber 36 and is provided with a hollow section 24 for maintaining the stability of the orientation of the airbag 31. The middle chamber 36 can therefore be prevented from being displaced. Because the surface area of contact between the vehicle compartment sidewall (door) 14 and the middle chamber 36 can be increased, the force for restraining the vehicle occupant 19 can be enhanced.

Second Embodiment

Figure 6:
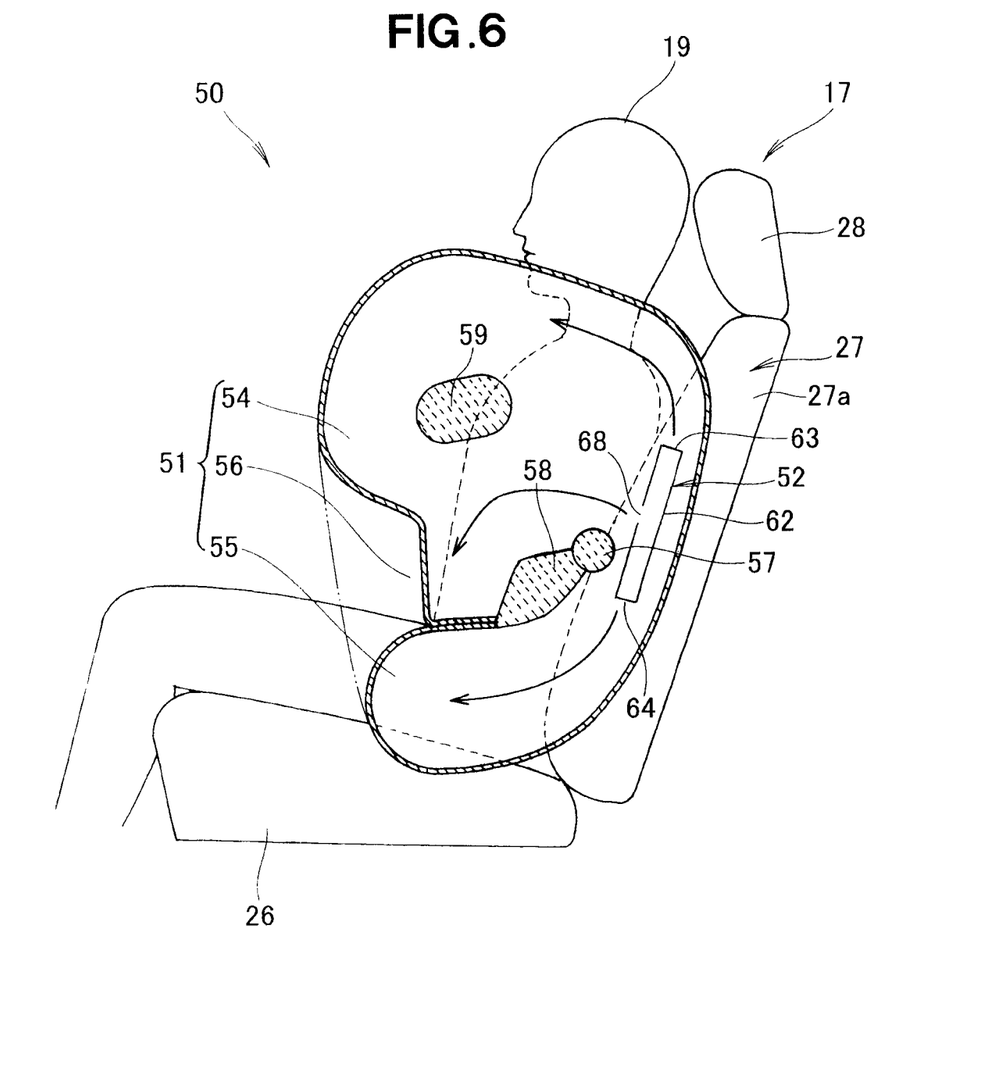
FIG. 6 is a cross-sectional view showing a side airbag apparatus according to a second embodiment of the present invention.

A side airbag apparatus 50 according to a second embodiment has an airbag 51 provided to the door-facing side surface 27a of the seatback 27, and also has an inflator 52 supported by the door-facing side surface 27a of the seatback 27, as shown in FIG. 6.

The airbag 51 is stored in a folded state inside the seatback 27 on the side corresponding to the door-facing side surface 27a, and is deployed between the vehicle occupant 19 and the vehicle compartment sidewall (door) 14, shown in FIG. 1, by the supply of gas from the inflator 52. The airbag 51 includes an upper chamber 54 deployed toward the upper section of the seat 17 disposed above the armrest 23 formed on the vehicle compartment sidewall (door) 14, and a lower chamber 55 deployed toward the lower section of the seat 17 disposed below the armrest 23.

The airbag 51 further includes a middle chamber 56 formed in the inflator 52 area between the upper chamber 54 and the lower chamber 55, a first non-expanding section 57 disposed between the middle chamber 56 and the inflator 52, a third non-expanding section 58 provided as a continuation of the first non-expanding section 57, and a non-expanding section 59 provided to the upper chamber 54 and disposed inside the upper chamber.

The first non-expanding section 57 and the third non-expanding section 58 operate to accelerate the timing at which the middle chamber 56 is expanded by the gas flowing out from first through third gas supply openings 63, 64, 68 provided to an inflator case 62. The other operations are substantially the same as in the first embodiment, and a description thereof is therefore omitted.

Third Embodiment

Figure 7:
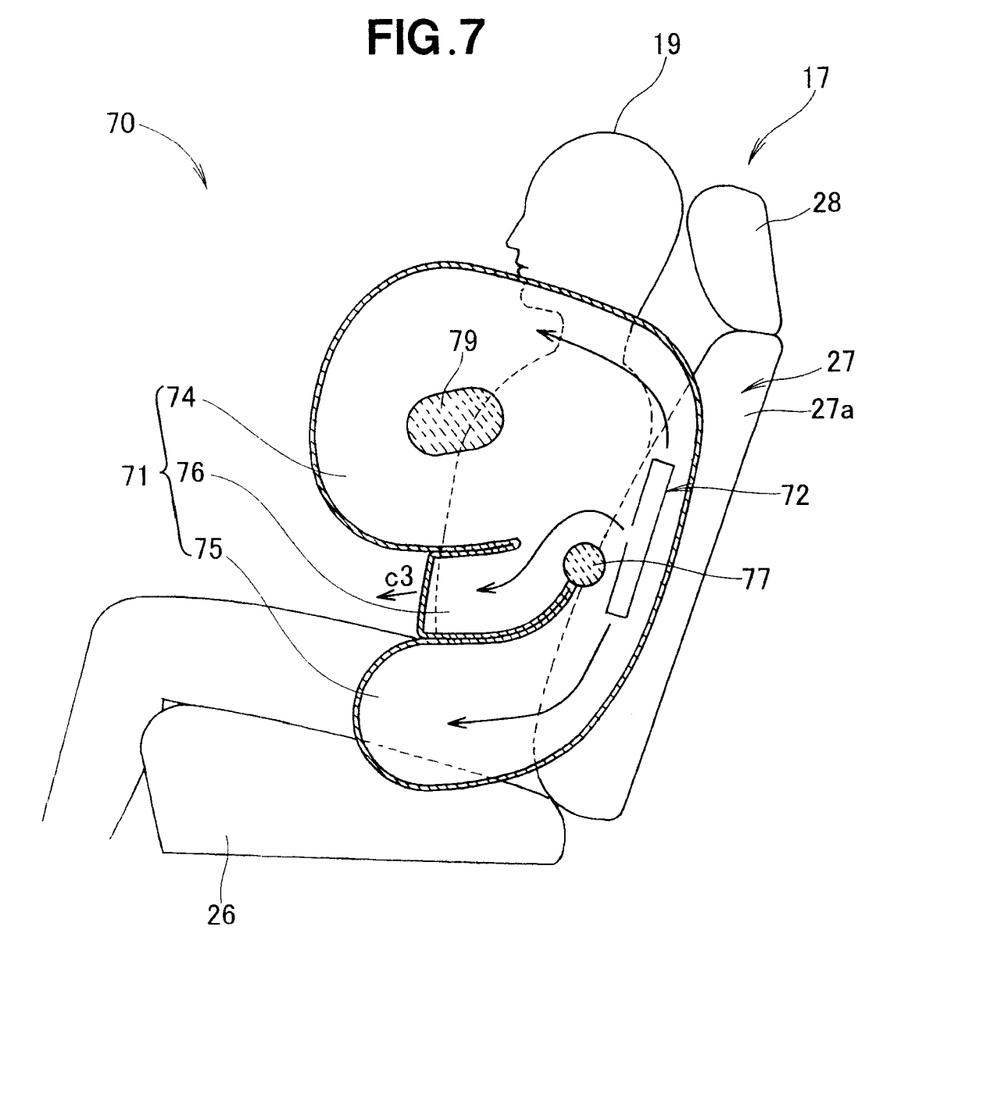
FIG. 7 is a cross-sectional view showing a side airbag apparatus according to a third embodiment of the present invention.

A side airbag apparatus 70 according to a third embodiment has an airbag 71 and an inflator 72, as shown in FIG. 7.

The airbag 71 is stored in a folded state inside the seatback 27 on the side corresponding to the door-facing side surface 27a, and is deployed between the vehicle occupant 19 and the vehicle compartment sidewall (door) 14, shown in FIG. 1, by the supply of gas from the inflator 72. The airbag 71 includes an upper chamber 74 deployed toward the upper section of the seat 17 disposed above the armrest 23 formed on the vehicle compartment sidewall (door) 14, and a lower chamber 75 deployed toward the lower section of the seat 17 disposed below the armrest 23.

The airbag 71 further includes a middle chamber 76 formed in the inflator 72 area between the upper chamber 74 and the lower chamber 75, a first non-expanding section 77 disposed between the middle chamber 76 and the inflator 72, and a non-expanding section 79 provided to the upper chamber 74 and disposed inside the upper chamber.

The third embodiment is different in that the middle chamber 76 is partitioned off and made independent from the upper chamber 74 or the lower chamber 75, and is a chamber capable of protruding as shown by arrow c3. The other aspects are substantially the same as in the first and second embodiments. This structure has the advantage of making it easy to adjust the volume and the expansion timing of the middle chamber 76.

Fourth Embodiment

Figure 8:
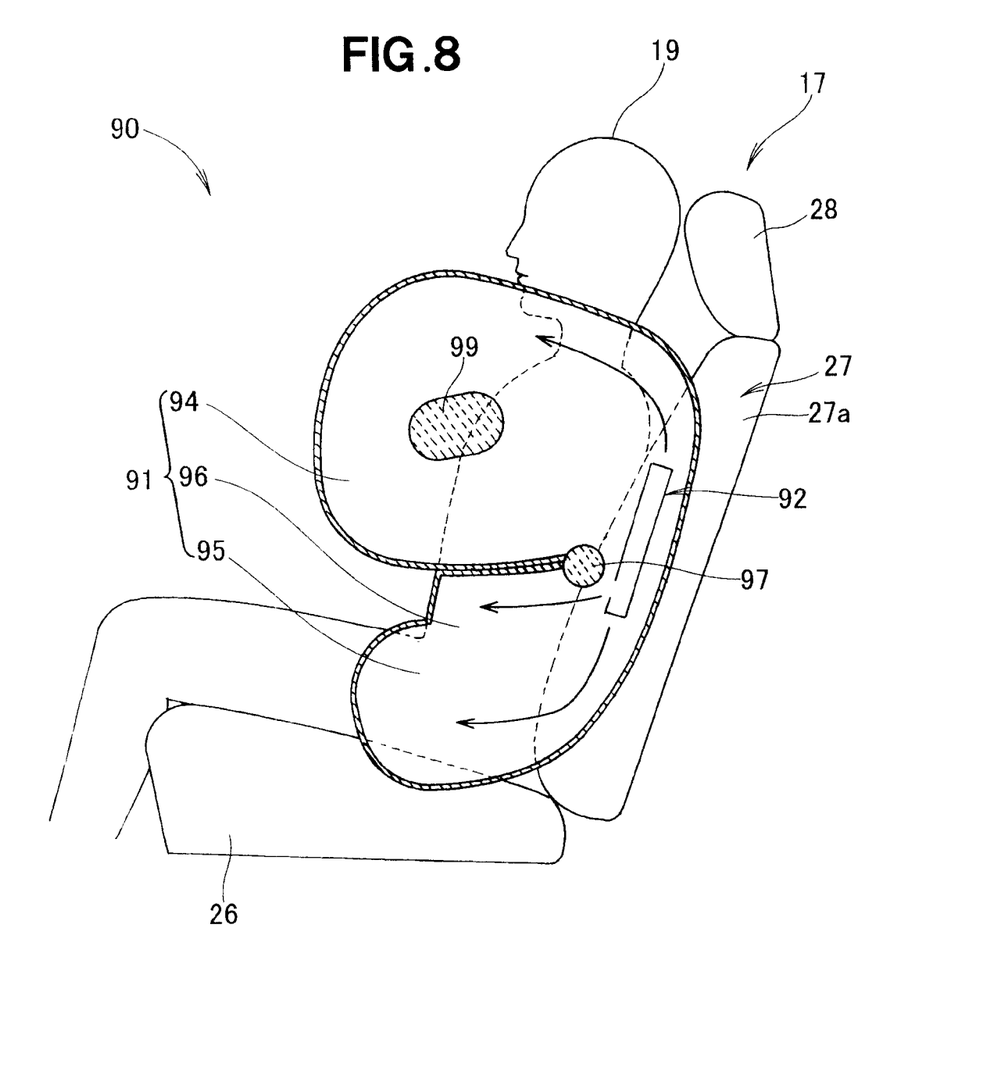
FIG. 8 is a cross-sectional view showing a side airbag apparatus according to a fourth embodiment of the present invention.

A side airbag apparatus 90 according to a fourth embodiment has an airbag 91 and an inflator 92, as shown in FIG. 8.

the airbag 91 is stored in a folded state inside the seatback 27 on the side corresponding to the door-facing side surface 27a, and is deployed between the vehicle occupant 19 and the vehicle compartment sidewall (door) 14, shown in FIG. 1, by the supply of gas from the inflator 92. The airbag 91 includes an upper chamber 94 deployed toward the upper section of the seat 17 disposed above the armrest 23 formed on the vehicle compartment sidewall (door) 14, and a lower chamber 95 deployed toward the lower section of the seat 17 disposed below the armrest 23.

The airbag 91 further includes a middle chamber 96 formed in the inflator 92 area between the upper chamber 94 and the lower chamber 95, a first non-expanding section 97 disposed between the middle chamber 96 and the inflator 92, and a non-expanding section 99 provided to the upper chamber 94 and disposed inside the upper chamber.

The fourth embodiment differs from the first through third embodiments in that the middle chamber 96 is formed in an upper section of the lower chamber 95. The other aspects are substantially the same. Generally, movement of the vehicle occupant is impeded by the deployment of the airbag 91 in cases in which a lower back is restrained. Therefore, it is preferable that the pressure be high in the lower chamber 95 at the initial stage of the deployment. This is advantageous in that the interior pressure of the middle chamber 96 is designed so as to be higher than in the upper chamber 94 at the initial stage of the deployment by forming the middle chamber 96 in the upper chamber 95, which has a comparatively small volume.

The side airbag apparatus according to the present invention can be used in a sedan, a wagon, or other such vehicle.

Obviously, various minor changes and modifications of the present invention are possible in light of the above teaching. It is therefore to be understood that within the scope of the appended claims the invention may be practiced otherwise than as specifically described.

What is claimed is:

1. A side airbag apparatus having an airbag deployed from a folded state between a sidewall of a vehicle compartment and an occupant by a gas supplied from an inflator,
   the airbag comprising:
   an upper chamber designed to be deployed forward from a side upper section of a seatback of a seat, the upper chamber including a forward edge that is horizontally offset from the seatback a first distance;
   a lower chamber designed to be deployed forward from a side lower section of the seat and including a forward edge that is horizontally offset from the seatback a second distance; and
   a middle chamber disposed closely to the inflator, between the upper chamber and the lower chamber, the middle chamber including a forward edge extending in a direction substantially orthogonal to a direction of deployment of the airbag and a partition, the forward edge of the middle chamber being horizontally offset from the seatback less than the first distance and the second distance, the partition extending from the middle chamber forward edge toward the inflator so as to separate at least one of the upper and lower chambers from the middle chamber and thereby restrict fluid communication between said middle chamber and said at least one of said upper and lower chambers.

2. The side airbag apparatus of claim 1, wherein the airbag includes a first non-expanding section provided between the middle chamber and the inflator.

3. The side airbag apparatus of claim 1, wherein the airbag includes a second non-expanding section extending between the upper chamber and the lower chamber, the second non-expanding section being positioned oppositely from the inflator, with the middle chamber interposed therebetween.

4. The side airbag apparatus of claim 1, wherein the middle chamber is disposed in opposed relation to an armrest provided on the vehicle compartment sidewall, the armrest having a hollow section that comes into contact with the middle chamber for maintaining the airbag stable in orientation.

5. The side airbag apparatus of claim 1, wherein the airbag has a distal folded section for folding up the forward edges of the upper and lower chambers, and an inflator-facing folded section for folding up the inflator area of the upper and lower chambers together with the middle chamber.

6. The side airbag apparatus of claim 1, wherein the partition is disposed between the middle chamber and the lower chamber.

7. The side airbag apparatus of claim 2, wherein the partition is disposed between the middle chamber and the lower chamber, and is connected to the first non-expanding section.

8. The side airbag apparatus of claim 1, wherein the partition is disposed between the middle chamber and the upper chamber.

9. The side airbag apparatus of claim 2, wherein the partition is disposed between the middle chamber and the upper chamber, and is connected to the first non-expanding section.

10. The side airbag apparatus of claim 2, where the partition is connected to the first non-expanding section.

11. A side airbag apparatus having an airbag deployed from a folded state between a sidewall of a vehicle compartment and an occupant by a gas supplied from an inflator,
    the airbag comprising:
    an upper chamber designed to be deployed forward from a side upper section of a seat;
    a lower chamber designed to be deployed forward from a side lower section of the seat;
    a middle chamber disposed closely to the inflator, between the upper chamber and the lower chamber; and
    a first non-expanding section provided between the middle chamber and the inflator,
    wherein the middle chamber has a forward edge extending in a direction substantially orthogonal to a direction of deployment of the airbag and formed further rearward than a forward edge of the upper chamber and a forward edge of the lower chamber.

12. The side airbag apparatus of claim 11, wherein the airbag includes a second non-expanding section extending between the upper chamber and the lower chamber, the second non-expanding section being positioned oppositely from the inflator, with the middle chamber interposed therebetween.

13. The side airbag apparatus of claim 11, wherein the middle chamber is disposed in opposed relation to an armrest provided on the vehicle compartment sidewall, the armrest having a hollow section that comes into contact with the middle chamber for maintaining the airbag stable in orientation.

14. The side airbag apparatus of claim 11, wherein the airbag has a distal folded section for folding up the forward edges of the upper and lower chambers, and an inflator-facing folded section for folding up the inflator area of the upper and lower chambers together with the middle chamber.

* * * * *